O. D. A. PEASE & J. F. FETTERLY.
CAR WHEEL QUENCHING DEVICE.
APPLICATION FILED FEB. 28, 1917.
1,276,106.
Patented Aug. 20, 1918.
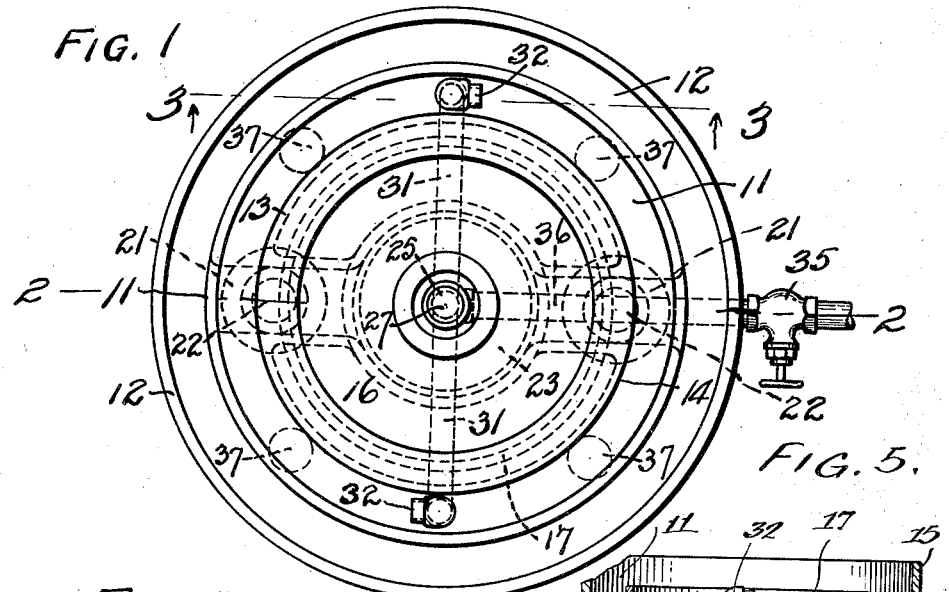
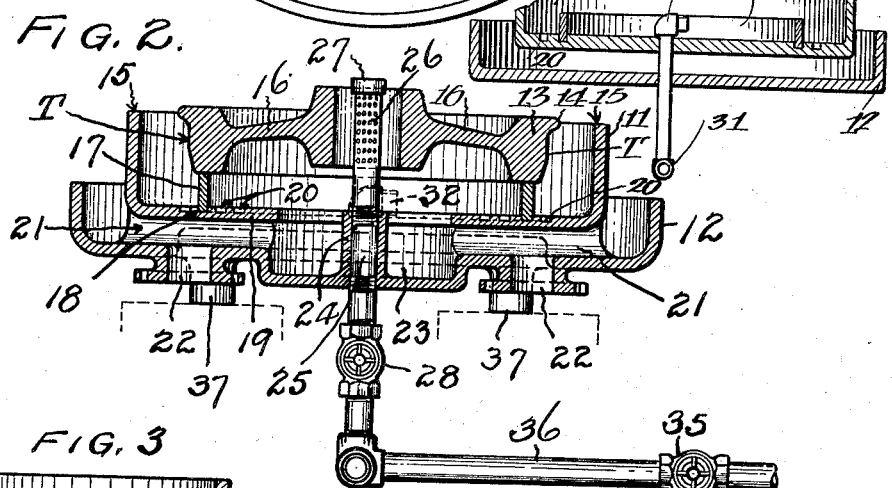
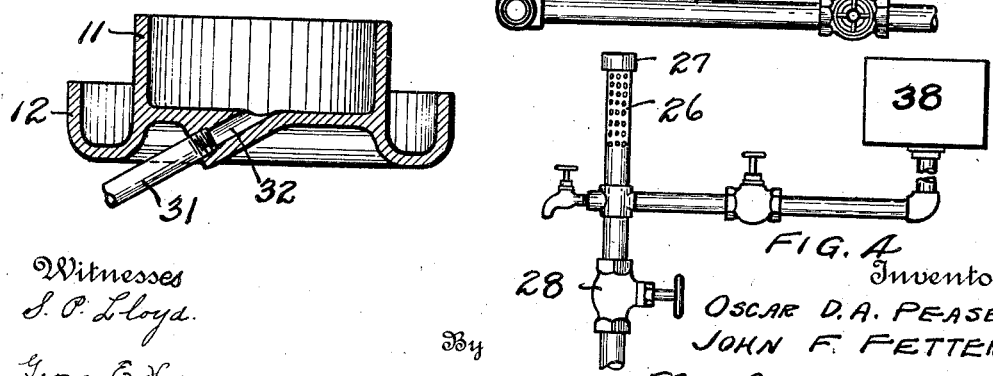
Witnesses
S. P. Lloyd.
George E. Hargreaves
Inventors
OSCAR D. A. PEASE
JOHN F. FETTERLY
By N. E. Gee
Attorney

UNITED STATES PATENT OFFICE.

OSCAR D. A. PEASE AND JOHN F. FETTERLY, OF ALTOONA, PENNSYLVANIA.

CAR-WHEEL-QUENCHING DEVICE.

1,276,106. Specification of Letters Patent. Patented Aug. 20, 1918.

Application filed February 28, 1917. Serial No. 151,620.

*To all whom it may concern:*

Be it known that we, OSCAR D. A. PEASE and JOHN F. FETTERLY, citizens of the United States, residing at Altoona, in the county of Blair and State of Pennsylvania, have invented certain new and useful Improvements in Car-Wheel-Quenching Devices, of which the following is a specification.

This invention relates to railway car wheels and has particular reference to a device for cooling the tread, flange and wheel fit of a car wheel through the action of a quenching medium, adapted to be introduced into the device and arranged to receive a heated car wheel.

The primary object of this device is to provide a car wheel treating arrangement whereby the flange, tread and wheel fit are each treated simultaneously with a quenching medium, thereby producing a more durable wheel than has heretofore been produced through the use of other wheel quenching devices.

Another object of this invention is to provide a car wheel heat treating receptacle, such that the wheel may be treated only at such points as hardness is required and to provide facilities for producing the degree of hardness desired, at the point desired, without subjecting the wheel to unnecessary strains due to the hardening process, which is not attained with other quenching devices with which we are familiar.

A further object of this device is to provide a car wheel quenching device wherein a rolled or forged steel car wheel can be so quenched that a hard treosto-martensitic steel tread is produced, fading gradually off into a troosto-sorbitic steel in the plate, thus increasing the hardness of the tread seventy-five per cent., as well as to enable the wheel to better withstand severe shocks without failure.

A still further object of this device is to provide means for controlling the flow of the quenching fluid, such that the desired hardening conditions may be obtained, together with means for preventing the quenching medium from coming in contact with the plate of the wheel.

Another object of this invention is to provide means for giving the quenching medium for the flange and tread a high velocity circular motion, together with means for conducting the heated quenching medium immediately away from the wheel being quenched.

With these and many other objects in view, which will be more readily apparent as the nature of the invention is better understood, the same consists in the novel combination, construction and arrangement of parts as will be hereinafter more fully pointed out, described, illustrated and claimed.

It will be quite readily understood, by those skilled in the art to which this invention belongs, that the same is quite susceptible of structure modification and construction without departing from the spirit or scope of the invention, but a preferred and practical embodiment of the same is shown in the accompanying drawings, in which—

Figure 1 is a plan view of our present invention with a car wheel placed therein. Fig. 2 is a sectional view taken on the line 2—2 of Fig. 1. Fig. 3 is a sectional view taken on a line of section corresponding to the line 3—3 of Fig. 1 and showing a modified form of the nozzle for introducing the quenching medium. Fig. 4 shows an arrangement used in connection with the wheel fit spraying device, which is adapted to be used for the purpose of re-heating the wheel fit, during the process of quenching, should it become necessary, by admitting some inflammable substance to the spraying nozzle, as for instance, gasolene. Fig. 5 is a true vertical sectional line taken on the line 3—3 of Fig. 1.

Similar reference numerals refer to similar figures throughout the several figures of the drawings.

Heretofore, it has been the general practice to make car wheels in such a manner that either the vital parts thereof are unevenly chilled in the cooling operation, or else are not chilled at all to produce the necessary hardening of the tread and wheel fit which are the parts which receive the greatest wear. That is to say, according to one method it has been the practice to mount a car wheel in a journal after it has been formed and while still in a highly heated condition, subject the same to a bath of water by submerging the periphery of the wheel to a depth of about one inch in the bath. This method however is faulty for the reason that it does not treat the tread of the wheel or any other vital part all at the same time, and thus produces an uneven cooling and hardening effect which tends to set up strains in the metal of the wheel which frequently manifest themselves under actual service conditions in the form of broken flanges or other more or less serious cracks, flat spots or fissues.

Another method for forming car wheels is the one which involves air treatment, or air cooling only. In this method the car wheels are forged or rolled at a forging heat and then permitted to cool on the floor of the mill, and then after cooling, the wheels are machined and ready for use. Obviously this is a simple and cheap manufacturing process, but leaves the vital parts of the wheel so soft that their efficiency, life and service is materially reduced. Accordingly, the present invention has particularly in view a novel form of apparatus whereby an entirely different process may be carried out which will produce a wheel not open to the objections above set forth. That is to say, it is proposed to provide a novel wheel quenching apparatus which simultaneously cools and hardens the fit and tread of the wheel to a uniform degree throughout, thus producing a car wheel having the advantages and characteristics hereinafter more fully pointed out.

In carrying out the foregoing objects of the invention, we construct an annular wheel receptacle which is adapted to receive the quenching fluid from beneath the wheel to be quenched, together with an annular receptacle for catching the quenching fluid after it has come in contact with the wheel device designated in its entirety by the numeral 10.

This device may be described as being constructed with two cup shaped receptacles, the one 11 being positioned within the other 12. The cup shaped receptacle 11 is preferably made such that its diameter is slightly in excess of the diameter of the largest wheel that is to be quenched and the depth such that when the wheel 13 is placed in position, the flange 14 is slightly higher than the edge 15 of the cup shaped receptacle 11.

For the purpose of giving the wheel the proper height, as well as to provide means for keeping the quenching medium from coming in contact with the web 16 of the wheel on the underside there is provided a ring 17, which is adapted to rest in a groove 18 in the bottom 19 of the cup shaped receptacle 11. Additional grooves 20 are provided in the bottom 19 for the purpose of receiving additional rings, suitable for different sized car wheels.

For the purpose of collecting the quenching medium as it flows over the edge 15 of the cup shaped receptacle 11, we have provided a concentric cup shaped receptacle 12, which is adapted to receive the overflow and conduct it through suitable passages 21 to outlet openings 22.

The receptacle 12 is provided with a bowl shaped recess 23, which is adapted to receive the scale from the wheel. The bowl shaped recess 23 is provided with an upstanding hollow cylindrical post 24, through which a quenching fluid supply pipe 25 protrudes, having a perforated portion 26, which is adapted to occupy a position in the center of the wheel fit, as shown in Fig. 2 of the drawings. A cap 27 is provided for the end of the pipe 25, which serves to prevent the quenching medium from flowing over the top and out onto the web of the wheel.

In the process of quenching wheels it is often necessary to regulate the flow of the quenching medium to the wheel fit, and for this purpose there is provided a valve 28 positioned in the pipe 25. For the purpose of supplying quenching fluid to the tread T and flange 14, there is provided a plurality of supply pipes 31, terminating in nozzles 32 which are positioned to give the quenching fluid a tangential motion, being deflected into a circular motion by the inside wall 33 of the cup shaped receptacle 11.

For the purpose of controlling the flow of the quenching fluid to the nozzles 32, there is provided a valve 35 positioned in the pipe 36 which supplies fluid to both nozzles 32, as well as to the upright spraying nozzle 26.

For the purpose of placing and keeping this quenching device in a horizontal position there is provided a plurality of projecting legs 37, which make the task of leveling the device a very easy matter.

Should it be desired to reheat the wheel fit during the process of quenching, there is provided an arrangement for the purpose as shown in Fig. 4 and consists primarily of a tank 38 which is adapted to contain some inflammable fluid such as gasolene, which can be directed into the nozzle 26, there ignited for the purpose of reheating the wheel fit to the desired temperature.

Having described our invention, the method of using the same may be described as follows: The wheel to be quenched is first heated to the proper hardening heat, then transported to the quenching apparatus and placed in position as shown in Fig. 2 of the drawings. The quenching medium is then applied to the tread, flange and hub or wheel fit until properly cooled. The wheel is preferably placed in the quenching device as shown in Fig. 2, with the flange side of the wheel uppermost, in order to insure the throat of the flange being properly chilled, thus producing the proper hardness in the throat of the wheel where it is exposed to wear, leaving the outside of the flange unquenched, thereby leaving the flange tough in order to resist flange failure.

The wheel fit, after having been chilled a sufficient amount has its quenching medium closed off for a period of time in order that the retained heat in the hub of the wheel may be conducted back to the wheel fit, thus drawing the temper in order that the wheel fit may be machined, after which the quenching medium is again applied to the wheel fit without subsequent hardening effect thereby shrinking the wheel as a whole and uniformly reducing the internal strains to a minimum.

After the wheel has been cooled to the proper degree it is transported to the temper drawing furnace, having the proper tempering heat to relieve the tread and throat of the flange of their brittle hardness, as well as to relieve the wheel as a whole of any internal strains, and also produce in the web, as well as in the hub, a very high degree of toughness.

By the foregoing process the tread or flange of a rolled or forged steel wheel, has the tread and flange increased in hardness seventy-five per cent. and its wearing abilities increased in greater proportion.

The original coarse crystalline structure of the rolled or forged steel car wheel is greatly refined by this thermal treatment. This fine crystalline structure in the tread and flange is found in microscopic tests to be in a troosto-martensitic condition, while the hub and web are found to be in a troosto-sorbitic condition, and the toughness of the wheel is increased by two hundred and fifty per cent., as determined by the M. C. B. drop tests.

According to this test a car wheel is supported at three points on the rim with the flange down and a trip hammer weighing 1,640 pounds suspended over the same at a distance of one foot. This hammer is then released and dropped on to the hub of the wheel and if the same does not fail under the impact of this blow the operation is repeated, the height of the hammer being increased one foot for each successive drop. The condition of the wheel is observed after each blow, and when the wheel fails by breaking the test is finished. Wheels made according to previous methods fail at from two to five feet in the described drop test, but a wheel treated according to the present invention will not fail until the blow is struck from a distance of from eight to twenty feet, with no permanent rupture taking place under fourteen feet. Thus, taking the average height at which wheels made according to present methods fail, namely $3\frac{1}{2}$ feet, and the average at which wheels treated according to the present invention fail, namely 14 feet, it will be seen that upon reducing this proportion of failures to a percentage basis, it will be clear that wheels treated according to the present method are about 300% more efficient. ($14-3\frac{1}{2}=10\frac{1}{2}$; $10\frac{1}{2} \div 3\frac{1}{2} = 3$ or 300%.) Accordingly it will be apparent that the previous estimate that the toughness of the wheel is increased by 250% is very conservative.

Having thus described our invention what we claim and desire to be secured by Letters Patent is:—

1. A device for quenching car wheels including in combination with a wheel, an annular cup-shaped stationary receptacle, an annular supporting ring for the wheel in said receptacle, an overflow receptacle positioned beneath the quenching receptacle, and means for introducing a jet of quenching medium into the said quenching receptacle between the inner wall thereof and the periphery of the wheel support tangential to the latter.

2. A device for quenching car wheels including in combination with a wheel, an annular cup-shaped receptacle having an opening, an annular support for the wheel in said receptacle and surrounding said opening, an overflow receptacle positioned beneath and about the quenching receptacle and in communication therewith through said opening, and means for introducing a quenching medium into said quenching receptacle between the inner wall thereof and the periphery of the wheel support.

3. A device for quenching car wheels including in combination with a wheel, an annular receptacle having an opening, an annular support for the wheel in said receptacle and surrounding said opening, an overflow receptacle positioned beneath and about the quenching receptacle and in communication therewith through said opening, and reversely disposed nozzles located between the wall of said quenching chamber and the wheel support, and a single nozzle projecting upwardly through the opening in the quenching receptacle.

4. A device for quenching car wheels including in combination with a wheel, an annular receptacle having an opening in its bottom wall and a plurality of concentric grooves, a wheel supporting ring adapted to be positioned in any one of the said grooves to support the car wheel whereby its tread portion coöperates with the vertical wall portion of the quenching receptacle to prevent the quenching medium from reaching the web of the wheel, an overflow receptacle adapted to catch the overflow from the quenching receptacle and also in communication therewith, means for supplying a quenching medium to the tread of the car wheel supported on said ring and other means for supplying a quenching medium to the fit of the wheel.

5. A device for quenching car wheels including in combination with a wheel, a receptacle having an opening in its bottom wall, a wheel supporting member located within the quenching receptacle and being of less height than the sides thereof, whereby when the wheel is supported thereon the tread of the latter will constitute the upper part of one wall of a quenching channel for the outer periphery of the supporting member and the inner wall of the quenching receptacle, an overflow receptacle in communication with said quenching receptacle inside of the wheel supporting member, and also receiving the overflow from the quenching channel of the quenching chamber, means for supplying a quenching medium to said channel of the quenching receptacle, and other means for supplying a quenching medium to the fit of the wheel supported in the quenching receptacle.

6. In combination with a car wheel, means for quenching the periphery of the wheel, and the inside of the flange of the wheel, means for submerging the tread of the wheel, a cup shaped receptacle for the wheel and quenching medium, means for introducing the quenching medium, means for collecting the quenching medium after it has come in contact with the wheel, and means for collecting the scale as it falls from the wheel during the process of quenching.

7. In a device for quenching the tread, flange and wheel fit of a car wheel, the wheel, a support for the wheel, a cup shaped perforated receptacle for the support and wheel, a receptacle for the wheel receptacle, a plurality of supports made integral with the latter receptacle, means for applying quenching fluid to the tread and flange of the wheel, a perforated nozzle positioned within the wheel fit and means for introducing an inflammable fluid into the nozzle for the purpose of re-heating the hub of the wheel.

8. In combination with a car wheel, a device for quenching the tread flange and wheel fit of the wheel, a perforated nozzle positioned within the wheel fit and adapted to be in piped relation with the quenching fluid and an inflammable fluid, means for controlling the flow of each fluid independent of each other, and means for increasing or decreasing the flow of quenching fluid to the tread and flange of the wheel.

9. In combination with a device for quenching the tread, wheel fit and inside of the flange of a car wheel, irrespective of the web of the wheel, a supporting ring for the wheel, a cup shaped receptacle for the wheel supporting ring, concentric grooves in the bottom of the cup shaped receptacle, a concentric cup shaped receptacle adapted to receive the first receptacle, quenching fluid adapted to be admitted to the first cup shaped receptacle, and conducted away from the wheel by the last named receptacle and means for leveling the wheel quenching device.

In testimony whereof we affix our signatures in the presence of two witnesses.

OSCAR D. A. PEASE.
JOHN F. FETTERLY.

Witnesses:
N. E. GEE,
ALEX WEIR.